(12) United States Patent
Young

(10) Patent No.: US 10,225,578 B2
(45) Date of Patent: Mar. 5, 2019

(54) INTRA-PREDICTION EDGE FILTERING

(71) Applicant: GOOGLE LLC, Mountain View, CA (US)

(72) Inventor: Joseph Young, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 129 days.

(21) Appl. No.: 15/590,274

(22) Filed: May 9, 2017

(65) Prior Publication Data

US 2018/0332303 A1 Nov. 15, 2018

(51) Int. Cl.
| | |
|---|---|
| *H04N 19/593* | (2014.01) |
| *H04N 19/159* | (2014.01) |
| *H04N 19/117* | (2014.01) |
| *H04N 19/124* | (2014.01) |
| *H04N 19/176* | (2014.01) |
| *H04N 19/182* | (2014.01) |

(52) U.S. Cl.
CPC ........ *H04N 19/593* (2014.11); *H04N 19/117* (2014.11); *H04N 19/124* (2014.11); *H04N 19/159* (2014.11); *H04N 19/176* (2014.11); *H04N 19/182* (2014.11)

(58) Field of Classification Search
CPC ... H04N 19/593; H04N 19/117; H04N 19/159
See application file for complete search history.

(56) References Cited

U.S. PATENT DOCUMENTS

| | | |
|---|---|---|
| 8,937,998 B2 | 1/2015 | Karczewicz |
| 9,154,787 B2 | 10/2015 | Kumar et al. |
| 9,225,986 B2 | 12/2015 | Bossen et al. |
| 9,258,563 B2 | 2/2016 | Chong et al. |
| 9,736,478 B2 | 8/2017 | Minezawa et al. |
| 9,736,494 B2 | 8/2017 | Suzuki et al. |
| 2012/0147955 A1 | 6/2012 | Budagavi |
| 2016/0044336 A1* | 2/2016 | Lee .................. H04N 19/593 |
| | | 375/240.12 |

OTHER PUBLICATIONS

Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.

(Continued)

*Primary Examiner* — Nam D Pham
(74) *Attorney, Agent, or Firm* — Young Basile Hanlon & MacFarlane, P.C.

(57) ABSTRACT

Coding a current block using a directional intra prediction mode is disclosed. The intra prediction mode includes a prediction angle and uses pixels peripheral to the current block to generate a prediction block. A method includes determining, using the prediction angle, a filter to apply to the pixels peripheral to the current block, filtering, using the filter, at least some of the pixels peripheral to the current block resulting in modified pixels, and generating a prediction block for the current block using the intra prediction mode and the modified pixels.

20 Claims, 10 Drawing Sheets

(56) References Cited

OTHER PUBLICATIONS

Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
International Search Report and Written Opinion in PCT/US2018/018309, dated Jul. 19, 2018, 22 pgs.
Yunfei Zheng et al., "CE13: Mode Dependent Hybrid Intra Smoothing", Joint Video Collaborative Team on Video Coding (JCT-VC) of ITU-T SG16 WP3 and ISO/IEC JTC1/SC29/WG11, 4th Meeting, Daegu, South Korea, Jan. 20-28, 2011, url: http://wftp3.itu.int/av-arch/jctvc-site/, document No. JCTVC-D282 (Jan. 16, 2011), 5 pgs.
S. Matsuo et al., "Modification of angular intra prediction", Joint Collaborative Team on Video Coding (JCT-VC) of ITU-T SG16 WP3 and ISO/IEC JTC1/SC29/WG11, 7th Meeting, Geneva, Switzerland, Nov. 21-30, 2011, url: http://wftp3.itu.int/av-arch/jctvc-site/, document No. JCTVC-G350 (Nov. 8, 2011), 5 pgs.

\* cited by examiner

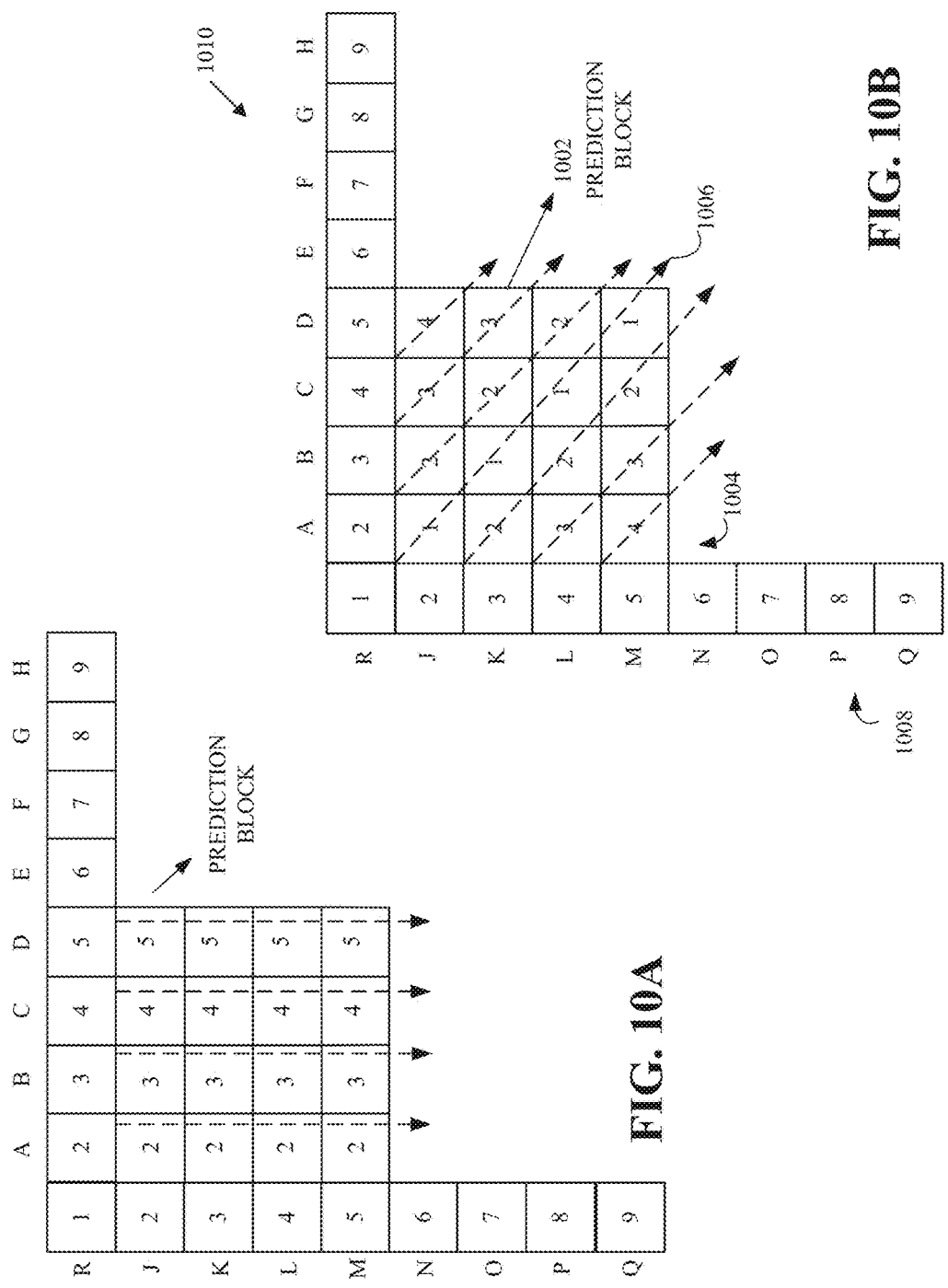

INTRA-PREDICTION EDGE FILTERING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

Encoding based on spatial similarities may be performed by breaking a frame or image into blocks that are predicted based on other blocks within the same frame or image. Differences (i.e., residual errors) between blocks and prediction blocks are compressed and encoded in a bitstream. A decoder uses the differences and the reference frames to reconstruct the frames or images.

SUMMARY

Disclosed herein are aspects, features, elements, and implementations for encoding and decoding blocks using intra-prediction edge filtering.

One aspect of the disclosed implementations is a method for coding a current block using an intra prediction mode, the intra prediction mode including a prediction angle and using pixels peripheral to the current block. The method includes determining, using the prediction angle, a filter to apply to the pixels peripheral to the current block, filtering, using the filter, at least some of the pixels peripheral to the current block resulting in modified pixels, and generating a prediction block for the current block using the intra prediction mode and the modified pixels.

Another aspect is an apparatus, including a memory and a processor, for encoding or decoding a current block using an intra prediction mode according to one implementation of this disclosure. The intra prediction mode includes a prediction angle and uses pixels peripheral to the current block. The processor is configured to execute instructions stored in the memory to determine, using the prediction angle, a filter to apply to the pixels peripheral to the current block, filter, using the filter, at least some of the pixels peripheral to the current block resulting in modified pixels, and generate a prediction block for the current block using the intra prediction mode and the modified pixels.

Another aspect is an apparatus, including a memory and a processor, for encoding or decoding a current block of a current tile using an intra prediction mode according to one implementation. The processor is configured to execute instructions stored in the memory to determine, using a first angle delta between the prediction angle and a vertical line parallel to a column of the current block, a first filter, determine, using a second angle delta between the prediction angle and a horizontal line parallel to a row of the current block, a second filter, filter, using the first filter, first pixels of the pixels peripheral to the current block that are located in a row adjacent to the current block, resulting in first modified pixels, filter, using the second filter, second pixels of the pixels peripheral to the current block that are located in a column adjacent to the current block, resulting in second modified pixels, and generate a prediction block for the current block using the intra prediction mode, the first modified pixels, and the second modified pixels.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

FIG. 10A is a diagram of an intra prediction mode having a 90 degree prediction angle according to implementations of this disclosure.

FIG. 10B is a diagram of an intra prediction mode having a 135 degree prediction angle according to implementations of this disclosure.

DETAILED DESCRIPTION

Figure 1:
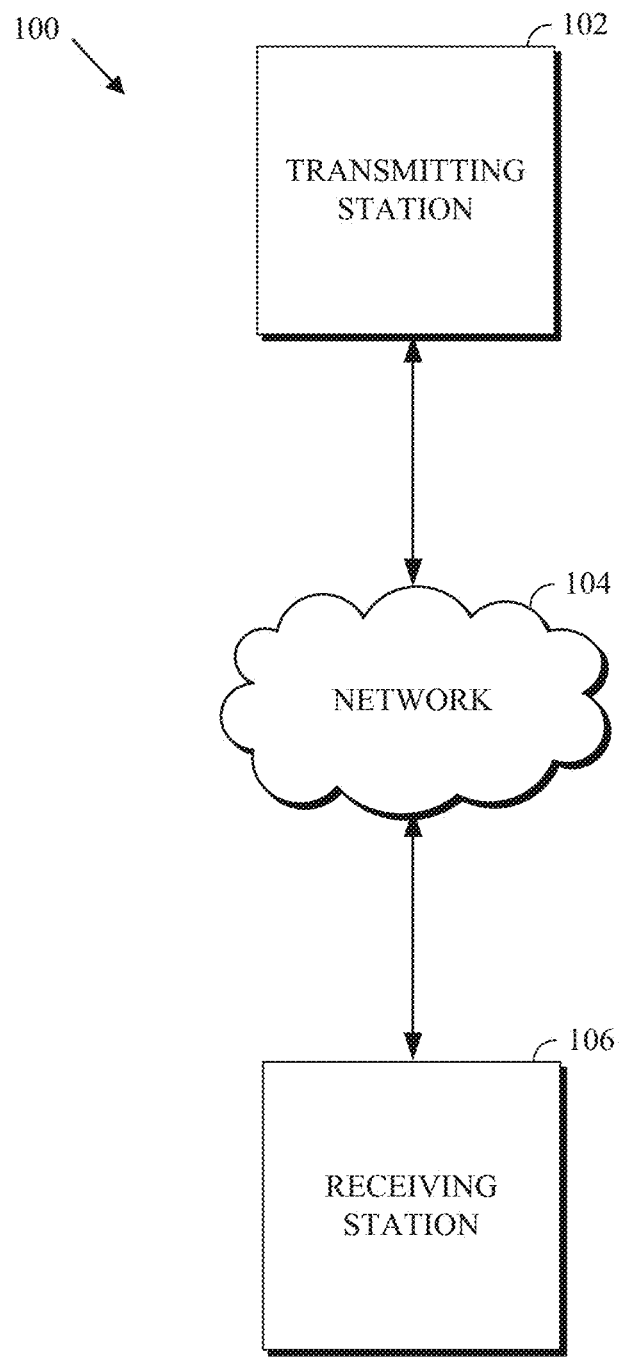
FIG. 1 is a schematic of a video encoding and decoding system.

As mentioned above, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities can be known as intra prediction. Intra prediction attempts to predict the pixel values of a current block of a frame of a video stream using pixels peripheral to the current block; that is, using pixels that are in the same frame as the current block but that are outside of the current block. Intra prediction can be performed along a direction of prediction, referred to herein as prediction angle, where each direction can correspond to an intra prediction mode. An intra prediction mode uses pixels peripheral to the current block being predicted. Pixels peripheral to the current block are pixels outside the current block. The intra prediction mode can be signalled by an encoder to a decoder.

Many different intra prediction modes can be supported. Some intra prediction modes use a single value for all pixels within the prediction block generated using at least one of the peripheral pixels. Others are referred to as directional intra prediction modes, which each have a corresponding prediction angle. Intra prediction modes can include, for example, horizontal intra prediction mode, vertical intra prediction mode, and various other directional intra prediction modes. As such, the prediction angle can be any angle between 0 and 360 degrees. In some implementations, the prediction angle can be any angle between 0 and 270 degrees. Available prediction angles can also be a subset of all possible prediction angles. For example, a codec can have available prediction modes corresponding to 50-60 prediction angles of the 0 to 360 prediction angles.

Various directional intra prediction modes can be used to propagate pixel values from previously coded blocks along an angular line (including horizontal, vertical, and directions offset from the horizontal and/or the vertical) to predict a block. For example, pixel values being propagated can include peripheral pixels above and/or to the left of the block in the same frame (e.g., when raster scan order is used in encoding).

The current block can be predicted by projecting reference pixels from peripheral pixels. For example, the peripheral pixels can include pixels to the left and above (i.e., top) boundaries of the current block, in a certain angle or direction that can be offset from the horizontal and the vertical lines. The reference pixels can be, for example, actual pixel values of the peripheral pixels or average pixel values (such as weighted average) of some of the peripheral pixels, which are propagated in angular directions to form the prediction block. The peripheral pixels can be combined in other ways to generate the reference pixels.

Figure 9:
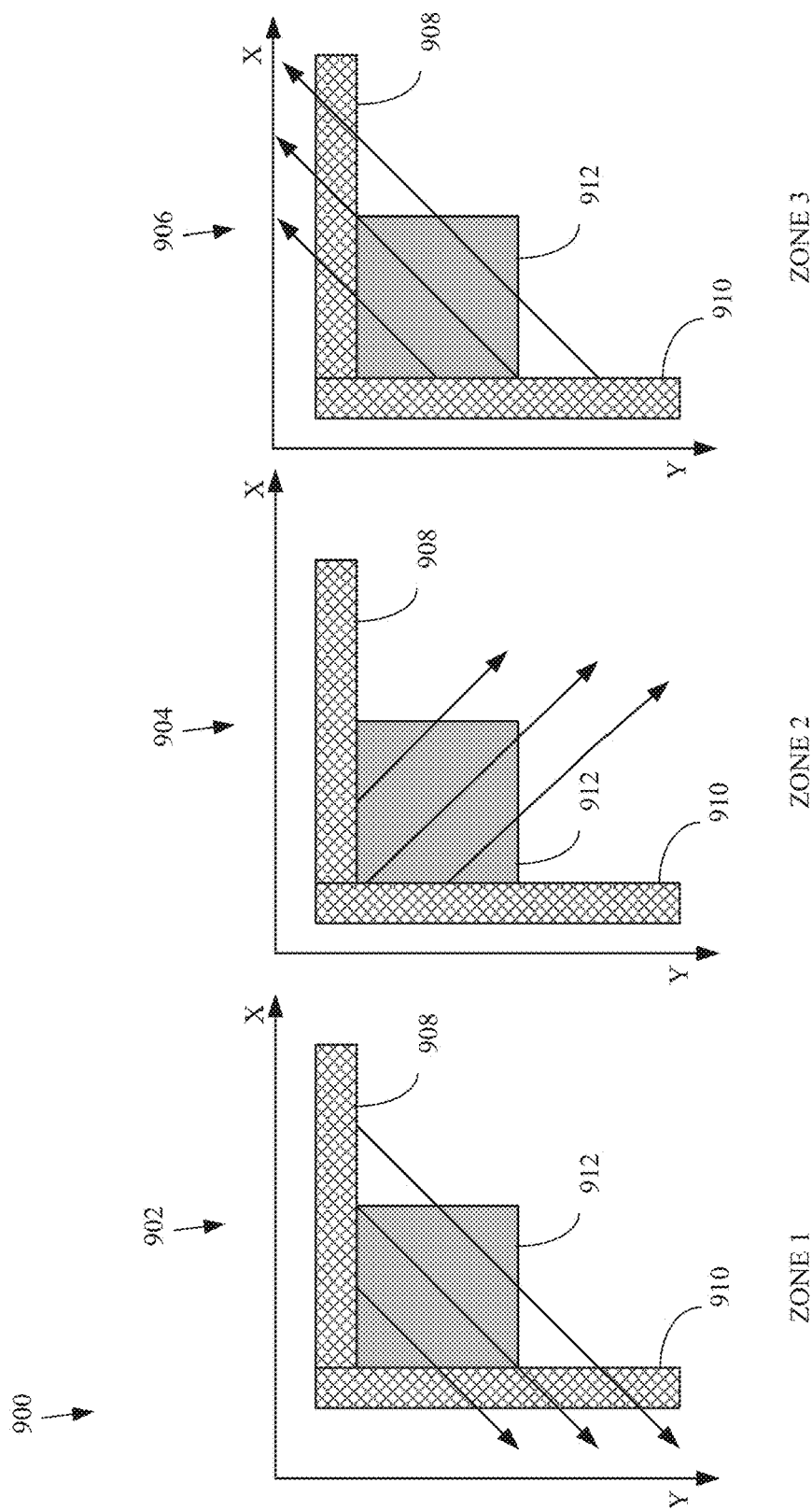
FIG. 9 is a diagram of directional intra prediction modes according to implementations of this disclosure.

FIG. 9 is a diagram 900 of directional prediction modes according to implementations of this disclosure. FIG. 9 illustrates three example directional prediction modes 902, 904, and 906 labeled Zone 1, Zone 2, and Zone 3, respectively. The illustrated directional prediction modes 902-906 can be used to generate a prediction block having dimensions conforming to a current block 912. Directional prediction mode 902 illustrates an intra prediction mode having a prediction angle between 0 and 90 degrees. Directional prediction mode 904 illustrates an intra prediction mode having a prediction angle between 90 and 180 degrees. Directional prediction mode 906 illustrates an intra prediction mode having a prediction angle between 90 and 180 degrees.

FIG. 9 also illustrates first pixels 908 in a row above the current block and second pixels 910 in a column to the left of the current block. The first pixels 908 and second pixels 910 can be used to generate the prediction block. In some implementations, directional predictions in Zone 1 (i.e., intra prediction modes having prediction angles between 0 and 90) use the first pixels 908 but may not use the second pixels 910 to generate the prediction block; directional predictions in Zone 2 (i.e., intra prediction modes having prediction angles between 90 and 180) use the first pixels 908 and the second pixels 910 to generate the prediction block; and directional predictions in Zone 3 (i.e., intra prediction modes having prediction angles between 180 and 270) use the second pixels 910 but may not use the first pixels 908 to generate the prediction block.

FIG. 10A is a diagram of an intra prediction mode having a 90 degree prediction angle according to implementations of this disclosure. FIG. 10A illustrates generating a prediction block for a 4×4 block to be predicted (also called a current block) and corresponds to a directional prediction in Zone 2 (i.e., the directional prediction mode 904) of FIG. 9. The intra prediction mode of FIG. 10A propagates peripheral pixels A through D down the columns of the prediction block such that each pixel in a column has its value set equal to that of the adjacent peripheral pixel A through D in the direction of the arrows.

FIG. 10B is a diagram of an intra prediction mode having a 135 degree prediction angle according to implementations of this disclosure. FIG. 10B illustrates generating a prediction block for a 4×4 current block and corresponds to a directional prediction in Zone 2 of FIG. 9. The intra prediction mode of FIG. 10B propagates peripheral pixel values along a 135 degree line (i.e., lines 1006) to the right and down to form the prediction block. The peripheral pixel values can include, for example, some of peripheral pixels 1008 (i.e., pixels A through R) from blocks adjacent to the 4×4 current block of a frame 1010, to form the prediction block 1002 for the current block. Although the 135 degree intra prediction mode in FIG. 10B is illustrated using the pixel values of the peripheral pixels 1008 to generate the prediction block 1002, for example, a linear combination (e.g., weighted average) of some (e.g., two, three, or more) of the peripheral pixels can be used to predict pixel values of the prediction block along lines extending through the block. For example, the pixel value 1004 to be propagated along line 1006 can be formed from a weighted average of pixel values K, L, and M.

The pixels of some video signals (e.g., signals of a high definition video or a 4K video) have relatively smooth gradients. As such, these video signals may not include many high frequency components. Rather, low frequency components mainly constitute such video signals. Intra prediction modes having sharp prediction angles can result in higher frequencies in the prediction signal that, in turn, can result in high frequency distortions.

Implementations of this disclosure can improve video compression and/or reduce distortions using intra-prediction edge filtering. As indicated above, an intra prediction mode uses pixels peripheral to the current block. Intra prediction edge filtering can eliminate distortions by applying low-pass filters to at least some of the pixels peripheral to the current block, resulting in modified pixels, and using the modified pixels to generate a prediction block.

Details are described herein after first describing an environment in which the multi-level compound prediction disclosed herein may be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
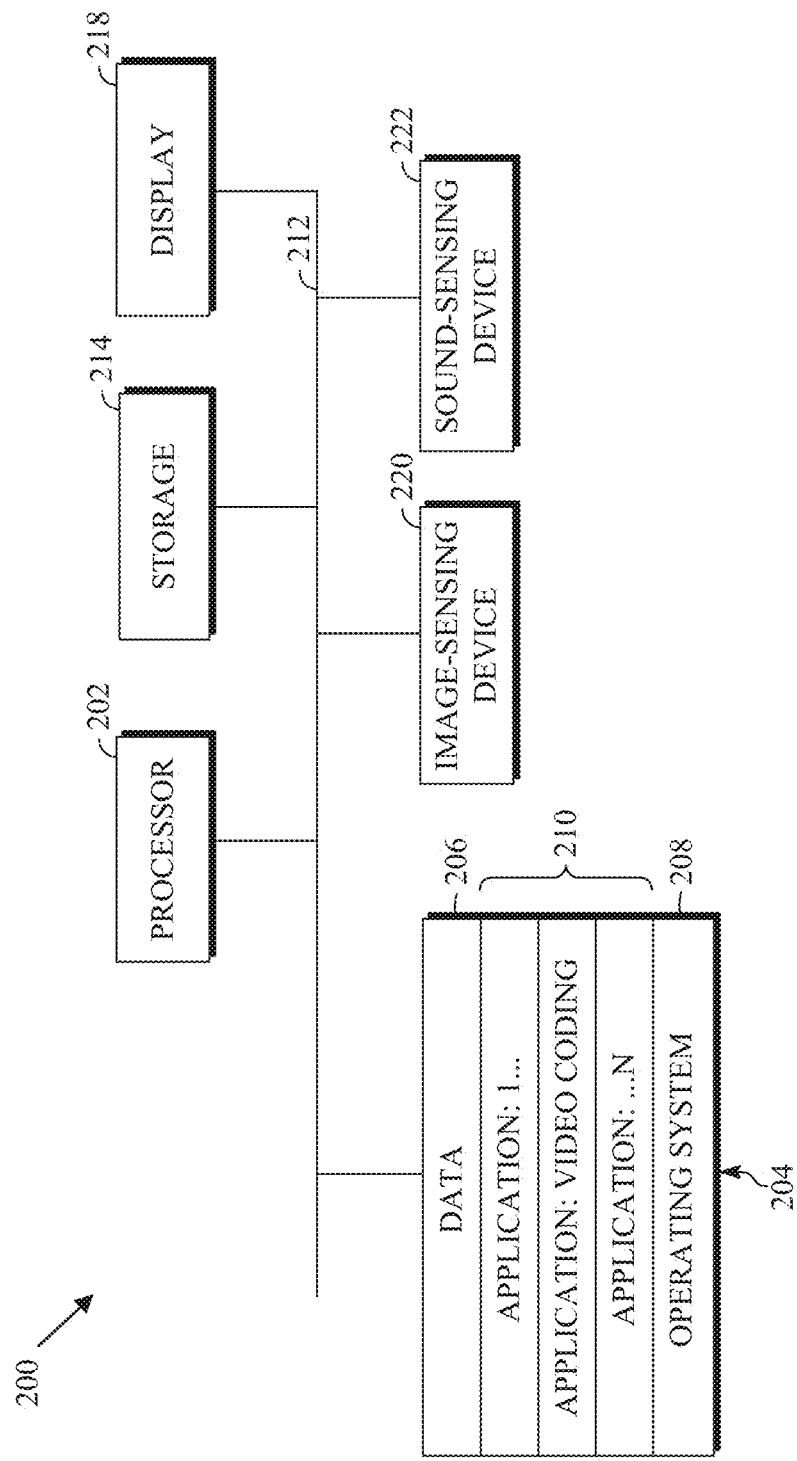
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hyper-Text Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
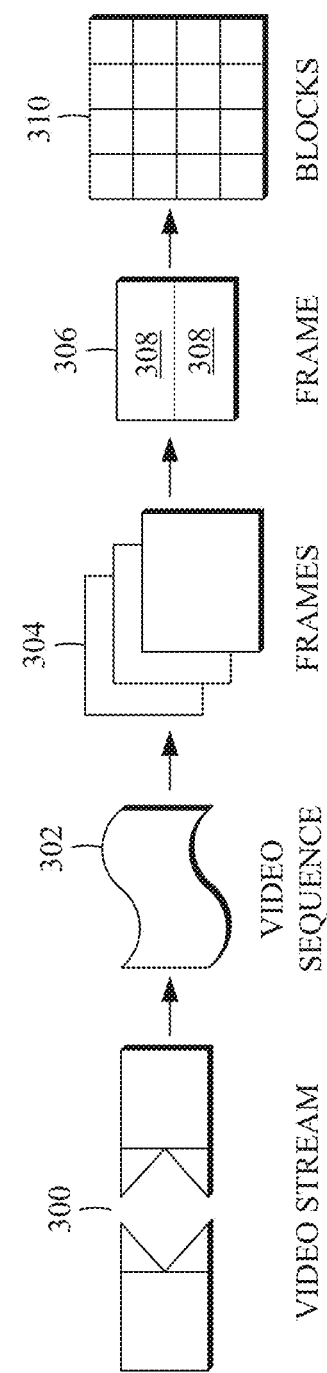
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
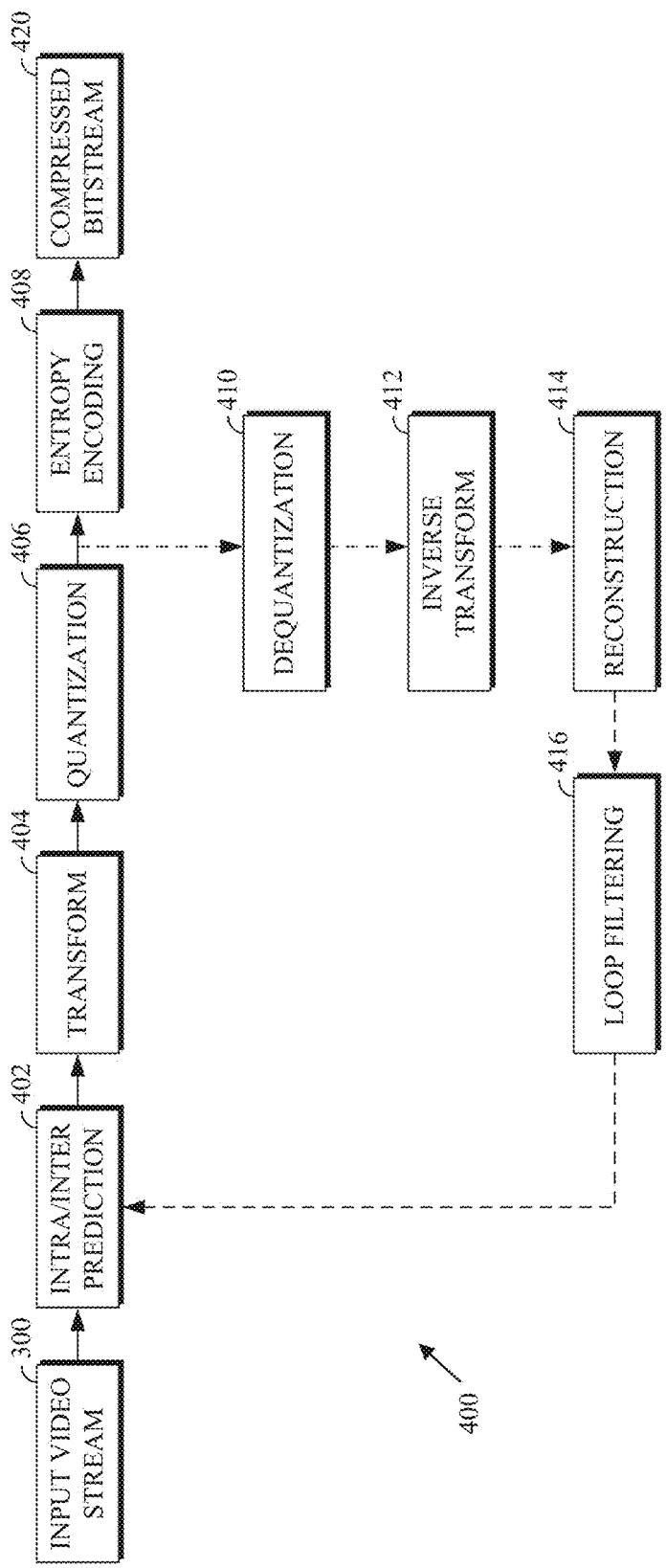
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
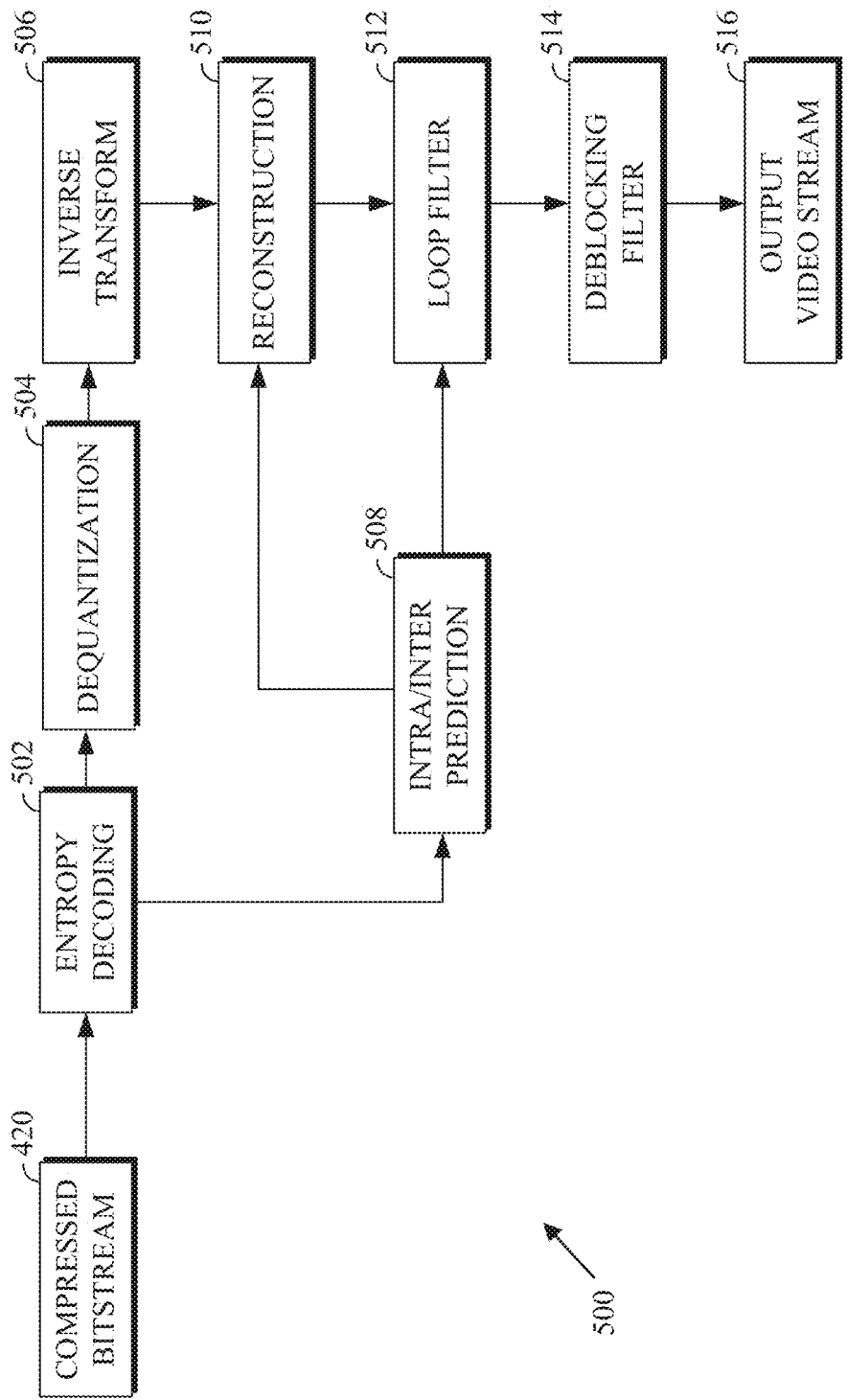
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described herein. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512. Additionally, or alternatively, the encoder 400 includes a deblocking filtering stage in addition to the loop filtering stage 416.

Figure 6:
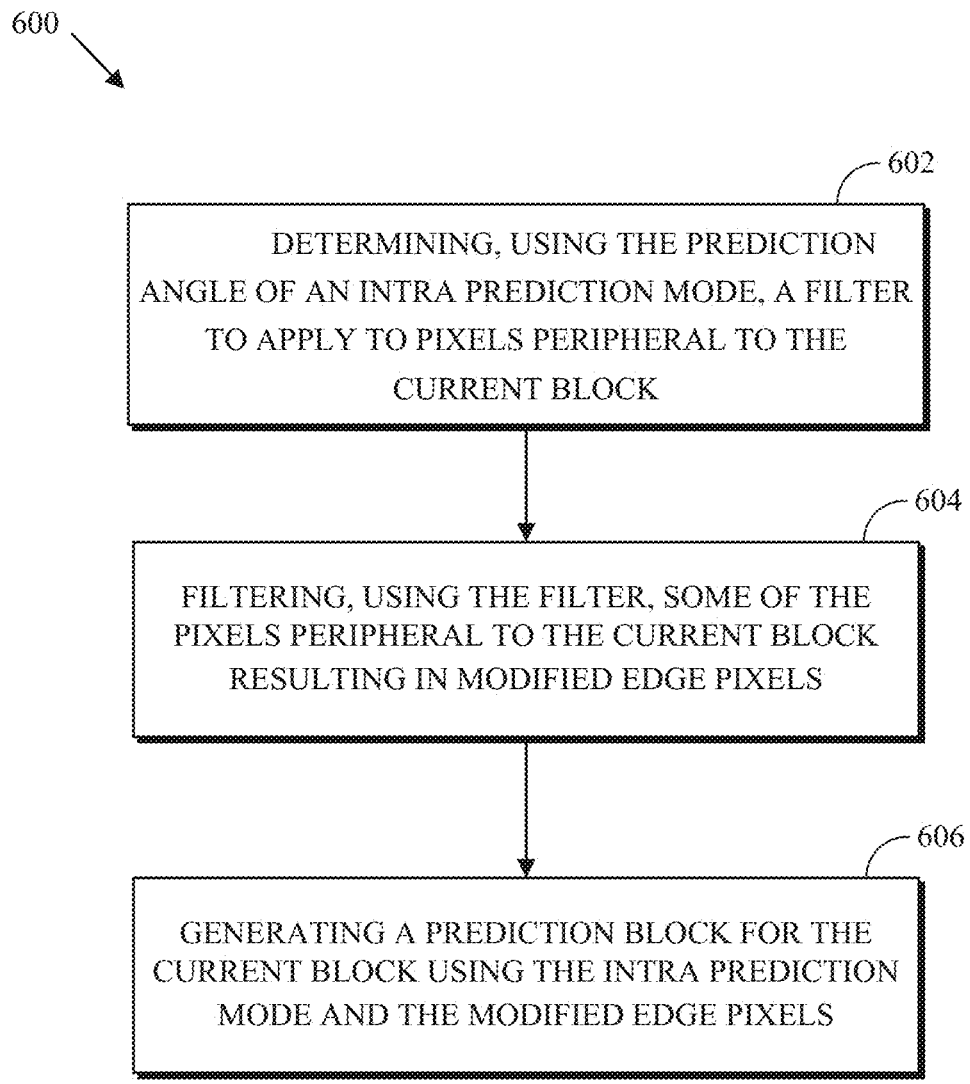
FIG. 6 is a flowchart diagram of a process for coding a current block using an intra prediction mode according to an implementation of this disclosure.

FIG. 6 is a flowchart diagram of a process 600 for coding a current block using an intra prediction mode according to an implementation of this disclosure. In these examples, the intra prediction mode has a corresponding prediction angle and uses pixels peripheral to the current block (e.g., a directional intra prediction mode is used). The pixels peripheral to the current block can be previously predicted pixels in the same video frame as the current block. The process 600 can be implemented in an encoder such as the encoder 400 of FIG. 4. The process 600 can be implemented in a decoder such as the decoder 500 of FIG. 5. The process 600 is described below with reference to FIGS. 7 and 8.

The process 600 can be implemented, for example, as a software program that can be executed by computing devices such as the transmitting station 102 or the receiving station 106. The software program can include machine-readable instructions that can be stored in a memory such as the memory 204 or the secondary storage 214, and that can be executed by a processor, such as CPU 202, to cause the computing device to perform the process 600. In at least some implementations, the process 600 can be performed in whole or in part by the intra/inter prediction stage 402 of the encoder 400 of FIG. 4. In other implementations, the process 600 can be performed in whole or in part by the intra/inter prediction stage 508 of the decoder 500 of FIG. 5.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

At 602, the process 600 determines, using the prediction angle, a filter to apply to the pixels peripheral to the current block. The process 600 can determine the filter as described with respect to FIGS. 7 and 8.

Figure 7:
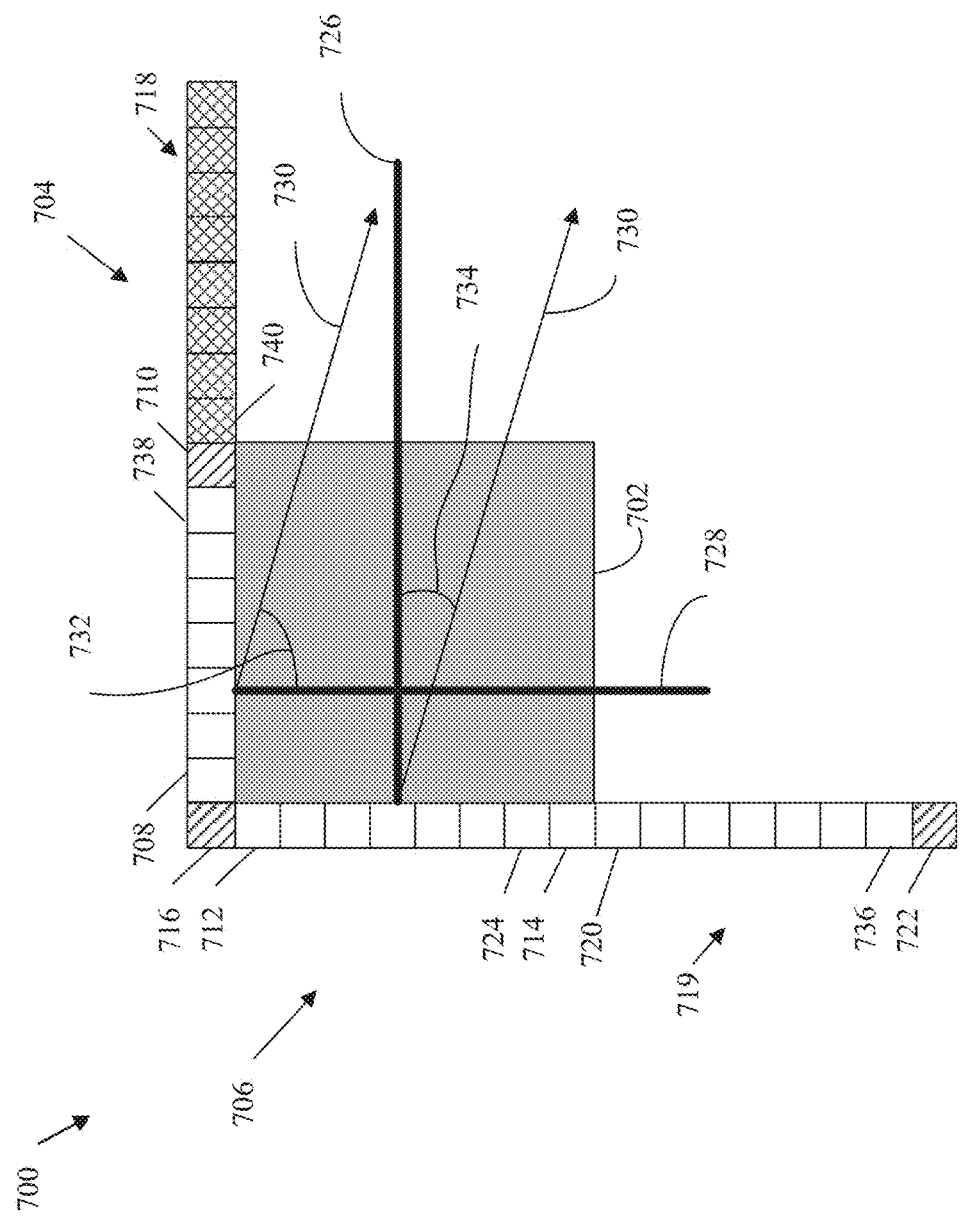
FIG. 7 is a diagram of intra prediction of a current block according to implementations of this disclosure.

FIG. 7 is a diagram 700 of an intra prediction of a current block according to implementations of this disclosure. The diagram 700 includes the current block 702. The current block 702 is shown as an 8×8 block. However, any block size is possible. For example, the current block can have a size (i.e., dimensions of) 4×4, 8×8, 16×16, 32×32, or any other square or rectangular block size. The current block 702 can be a block of a current frame. In another example, the current frame may be partitioned into segments (such as the segments 308 of FIG. 3), tiles, or the like, each including a collection of blocks, where the current block is a block of the partition. For example, a current frame may be partitioned into four tiles (e.g., a top-left tile, a top-right tile, a bottom-left tile, and a bottom-right tile). Each tile includes blocks, at least some of which can be processed in accordance with this disclosure. The blocks of a tile can be of different sizes. For example, an 8×8 block can have an adjacent 16×16 left block. A tile, as used herein, refers to a frame or a partition of a frame. The blocks of a tile can be processed based on a scan order of the tile.

In this example, the current block 702 is intra predicted using an intra prediction mode having a prediction angle as illustrated by the directional lines 730. As indicated above, the prediction angle can be any angle between 0 and 360 degrees. The prediction mode uses pixels peripheral to the current block 702. Peripheral pixels are pixels that are outside of the current block 702 and within the current frame. The peripheral pixels can include one or more rows and columns adjacent to the current block 702. The peripheral pixels include first pixels 704 in a row and second pixels 706 in a column. The first pixels 704 include the eight horizontal pixels between pixels 708 and 710 (e.g., corresponding to the horizontal dimension of the 8×8 current block 702). The second pixels 706 include the eight vertical pixels between pixels 712 and 714 (e.g., corresponding to the vertical dimension of the 8×8 current block 702). The peripheral pixels can include a corner pixel 716, which is at the intersection of the first pixels 704 and the second pixels 706.

The first pixels 704 are depicted above (i.e., on top of) the current block and the second pixels 706 are depicted to the left of the current block 702. However, this need not be the case. The horizontal pixels and the vertical peripheral pixels can be selected based on a scan order of the current tile. For example, in a raster scan order, the blocks of a tile may be processed, row-wise, from the top left block to the bottom right block. In a case where, for example, the scan order is from bottom right to top left, the first pixels (e.g., the horizontal peripheral pixels) may be below the current block and the second pixels (e.g., the vertical peripheral pixels) may be to the right of the current block. Zig-zag or other scan orders are also possible. In FIG. 7, the first pixels 704 are depicted as comprising one row of horizontal pixels and the second pixels 706 are depicted as comprising one column of vertical pixels. This need not be the case. The first pixels 704 can include one or more rows of pixels. The second pixels 706 can include one or more columns of pixels. The corner pixel 716 is a single top-left pixel, but could comprise more than one pixel and/or be located in a different position relative to the current block 702 in these alternative implementations.

Depending on the intra prediction mode (i.e., the prediction angle), additional peripheral pixels may be used to perform the intra prediction. The number of additional pixels in the horizontal and/or vertical directions can be, but not need be, the same as the horizontal and/or vertical dimension of the current block 702, respectively.

The additional pixels can be previously decoded or predicted pixels, if available. For example, the second pixels 706 are depicted as including additional pixels 719. The additional pixels 719 can be the pixels of an adjacent and previously predicted or decoded block within the same tile as the current block 702.

The additional pixels can be extended pixels. Extended pixels can be used when neighboring pixels (i.e., pixels from an adjacent and previously predicted or decoded block) are not available for use. For example, neighboring pixels may not be available for use when a current block abuts (i.e., is adjacent to) a boundary (i.e., a vertical edge and/or a horizontal edge) of the current tile. As another example, neighboring pixels may not be available when a neighboring block that includes the needed pixels is not decoded or predicted before the current block.

Extended pixels can be derived from other adjacent peripheral pixels. Here, the first pixels 704 are depicted as including extended pixels 718 (indicated as shaded pixels). In an example, the extended pixels 718 can be derived by extending the value of the last (e.g., in the direction of the scan order) peripheral pixel value coincident with the horizontal dimension of the current block 702. For example, the value of each of the pixels 718 can be set to the value of the last pixel 710. In a left-to-right and top-to-bottom scan order, the last pixel 710 is the last non-extended pixel of the first pixels 704 since it is the right-most pixel in the left-to-right scan order, and the last pixel 722 is the last non-extended pixel of the second pixels 706 since it is the bottom-most pixel in the top-to-bottom scan order. While FIG. 7 depicts only extended horizontal pixels (i.e., extended pixels 718), extended vertical pixels are also possible. For example, if the additional pixels 719 were not available, then the second pixels 706 may include extended vertical pixels, if necessitated by the intra prediction mode, that all use the value of the pixel 714 that is coincident with the vertical dimension of the current block 702.

The process 600 can determine a filter to apply to the pixels peripheral to the current block 702 based on a difference between a line perpendicular to the top edge (i.e., the horizontal edge) of the current block and the prediction angle. That is, the filter is determined based on a vertical line that is parallel to the left edge of the current block 702 and the prediction angle. Determining a filter can include determining a first filter for (i.e., to be applied to) the first pixels 704 and a second filter for the second pixels 706.

For example, the first filter to be applied to the first pixels 704 (i.e., the peripheral pixels above the current block), can be determined based on angle delta 732. The angle delta 732 is the angle between a line 728 that is a vertical line parallel to the left edge of the current block and the prediction angle indicated by the directional lines 730. The second filter can be determined based on angle delta 734. Angle delta 734 is the angle between a horizontal line 726 that is parallel to the top edge of the current block 702 and the prediction angle indicated by the directional lines 730.

In an example, the angle delta 732 and the angle delta 734 can be calculated based on the prediction angle using the following formulas:

Angle delta 732=$ABS$ (prediction angle−90)

Angle delta 734=$ABS$ (prediction angle−180)

That is, for the first pixels 704 (e.g., peripheral pixels that are along a horizontal line), the angle delta 732 can be the absolute value of the difference between the prediction angle and 90 degrees; for the second pixels 706 (e.g., peripheral pixels that are along a vertical line), the angle delta 734 can be the absolute value of the difference between the prediction angle and 180 degrees.

In addition to the angle delta, the process 600 can determine the filter based on the size of the current block. The filter determined by the process 600 can be a low-pass n-tap filter. A 3-tap filter is described below with respect to FIG. 8. However, other types of filters and filter sizes can be selected.

In some cases, the process 600 can determine a filter strength based on the angle delta and the block size. For example, Table 1 illustrates filter strengths based on an angle delta and the current block size.

| Angle Delta | Block Size | | | |
|---|---|---|---|---|
| | 4 × 4 | 8 × 8 | 16 × 16 | 32 × 32 |
| Angle Delta = 0 | 0 | 0 | 0 | 0 |
| Angle Delta between (0, 3) | 0 | 0 | 0 | 2 |
| Angle Delta between (4, 7) | 0 | 0 | 1 | 2 |
| Angle Delta between (8, 15) | 0 | 1 | 1 | 2 |
| Angle Delta between (16, 31) | 0 | 1 | 3 | 3 |
| Angle Delta between (32, 90) | 0 | 3 | 3 | 3 |
| Angle Delta > 90 | Unused | Unused | Unused | Unused |

Filters with increasing strengths (e.g., the modified pixel value receives a higher percentage of contribution from adjacent pixel values than the current pixel value) can be selected as the angle delta increases. For example, for a 16×16 block, when the angle delta is between 4 and 7, a filter of strength 1 can be selected, whereas a filter of strength 3 is selected when the angle delta is between 16 and 31. A filter strength of zero can indicate that no filter is to be selected (i.e., no filtering is to be performed). In an example, no filter is selected for 4×4 blocks. For an 8×8 block, filtering can start for angle deltas greater than 8. For a 16×16 block, filtering can start for angle deltas greater than 4. For 32×32 blocks, filtering can start for angle deltas greater than 0. A filter strength of zero can mean that the process 600 is to bypass filtering of the peripheral pixels (i.e., apply no filtering to the peripheral pixels).

As an illustration of using Table 1, assume that the current block is a 32×32 block and that the prediction mode is a vertical prediction mode (as described with respect to FIG. 10A). As such, the angle delta 732 is zero (i.e., ABS (90−90)). A delta value of zero, according to the first row of Table 1, results in a filter of zero strength. A filter of zero strength can correspond to no filtering. Therefore, when the prediction angle is 90 degrees, no filtering is performed on the first pixels (e.g., peripheral pixels that are above the current block). The angle delta 734 is 90 (i.e., absolute (180−90)). Even though Table 1 indicates a filter of strength 3 for an angle delta between (32, 90), the process 600 may not filter the second pixels (e.g., peripheral pixels that are to the left of the current block) because, as described with respect to FIG. 10A, the left pixels (i.e., J-R of FIG. 10A) are not required for the vertical intra prediction mode.

As another example, assume that the current block is a 16×16 block and that the prediction mode has a prediction angle of 135 degrees as illustrated in FIG. 10B. As such, the value of the angle delta 732 (the angle delta for the first pixels above the current block) is 45 (i.e., ABS (135−90)) which results in a filter of strength 3. Correspondingly, the angle delta 734 (the angle delta for the second pixels to the left of the current block) is also 45 (i.e., ABS (135−180)) which also results in the filter of strength 3.

As yet another example, the process 600 can determine a filter when the angle delta is greater than a threshold. For example, a filter is not determined when the angle delta is greater than a threshold of 90 degrees. When a filter is not determined, filtering the peripheral pixels is bypassed. For example, assume the current block is an 8×8 block and that the prediction mode has a prediction angle of 195 degrees. As such, the value of the angle delta 732 (the angle delta for the first pixels above the current block) is 105 (i.e., ABS (195−90)). Table 1 indicates that where the angle delta is greater than 90, then the filter strength is "unused." An "unused" filter strength can indicate that the peripheral pixels corresponding to the calculated angle delta may not be used to generate the prediction block, as described above with respect to FIG. 9. As such, filtering these pixels is unnecessary. Alternatively, even if the peripheral pixels are used to generate the prediction block, filtering may be bypassed when the angle delta is greater than the threshold (e.g., 90 degrees). Correspondingly, the angle delta 734 (the angle delta for the second pixels to the left of the current block) is 15 (i.e., ABS (195−180)), which results in a filter of strength 1.

As described above, the process 600 determines a filter. Examples of filters include a 3-tap filter with weights (1, 2, 1) and a 3-tap filter with weights (5, 6, 5) shown in FIG. 8. Other filters are possible. As also described above, the process 600 can determine a filter strength. By selecting a filter strength, a filter can be correspondingly determined. For example, a filter strength of 2 can correspond to the (1, 2, 1) filter. A filter strength greater than 2 can correspond to the filter (5, 6, 5). A filter strength of zero can indicate that no filtering is to be performed. Alternatively, a filter strength of zero can correspond to a (0, 1, 0) filter.

In another example, the filter strength can be further based on a quantization parameter that regulates the encoding bit rate and can be based on an activity measure (e.g., a variance value). A quantization parameter can be available for the current block (i.e., a block-level quantization parameter), for the current frame (i.e., a frame-level quantization parameter) that contains the current block, or both. A block-level quantization parameter can be encoded by an encoder in the block header and decoded by a decoder from the block header. A frame-level quantization parameter can be encoded by an encoder in the frame header and decoded by a decoder from the frame header. Where a block-level quantization parameter is not available, the frame-level quantization parameter can be used as the block-level quantization parameter. A relatively low quantization parameter can be indicative of more detail in the current frame (or current block, as the case may be) and a relatively high quantization parameter can be indicative of lower details in the current frame (or block). As such, the quantization parameter can be used to modulate the filter strength. For example, the strength of the filter can be proportional to the value of the quantization parameter. That is, weaker filtering can be applied for lower values of the quantization parameter and stronger filtering can be applied for higher values of the quantization parameter. In one application of this example, the filtering strength (and accordingly the filter) determined by the angle delta(s) and/or the block size can be reduced by a value of one for values of the quantization parameter below a lower limit, and increased by a value of one for values of the quantization parameter above an upper limit. Variations of incorporating the quantization parameter into the filter selection, or into the application of the filter(s) to obtain modified values are possible.

At 604, the process 600 filters, using the filter, at least some of the pixels peripheral to the current block. The filtering results in modified pixels. Filtering is further described by reference to FIG. 8.

Figure 8:
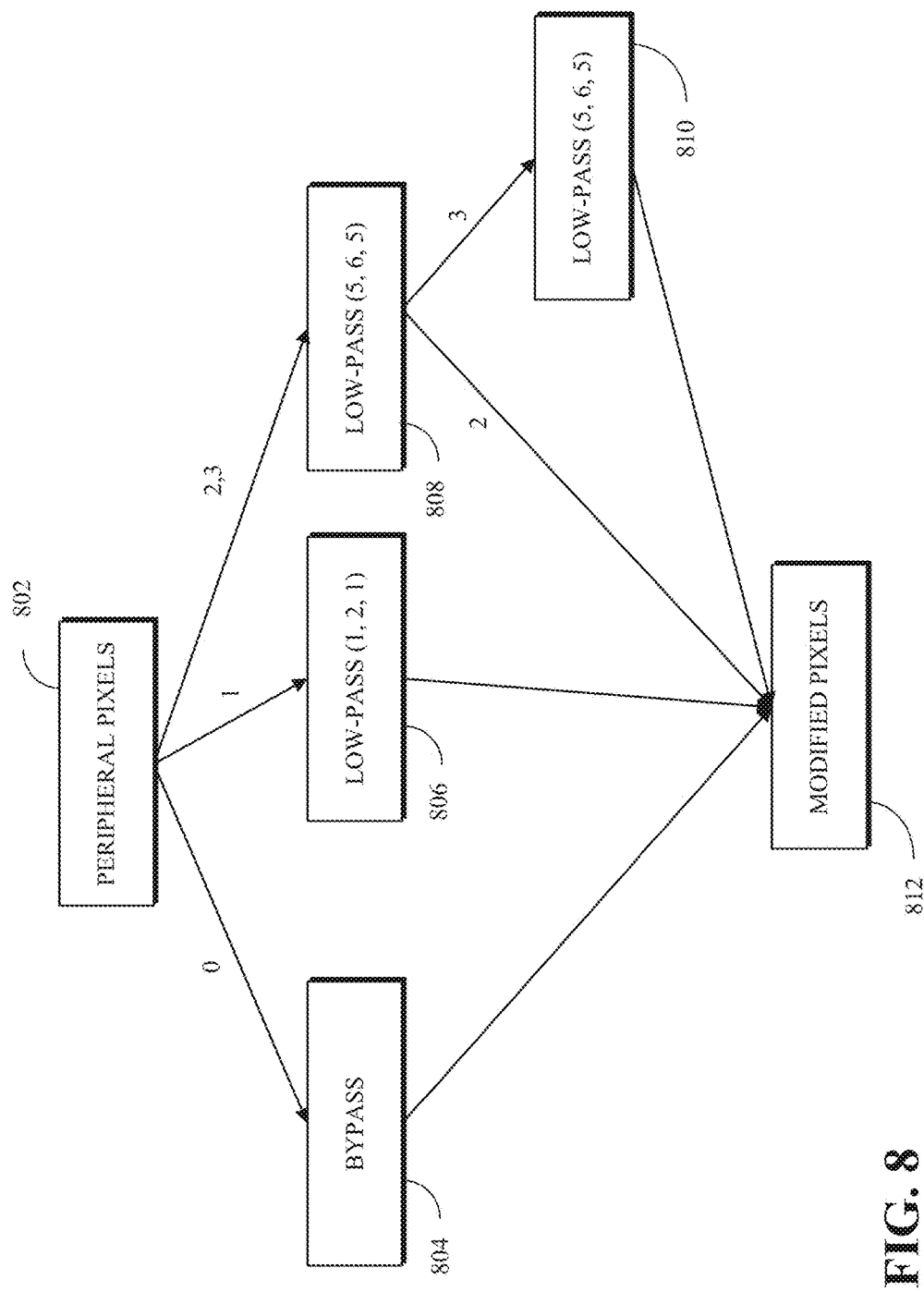
FIG. 8 is a diagram of an example of filtering peripheral pixels according to implementations of this disclosure.

FIG. 8 is a diagram 800 of an example of filtering peripheral pixels according to implementations of this disclosure. The diagram 800 identifies peripheral pixels 802. The peripheral pixels 802 are filtered based on the filter and/or a filter strength determined by the process 600 at 602. The filtering results in modified pixels 812. The peripheral pixels 802 can be the first pixels 704 and/or the second pixels 706 of FIG. 7.

In the case of a filter strength of zero, the process 600 bypasses filtering at 804. That is, the process 600 does not perform filtering of the peripheral pixels. As such, the modified pixels 812 are the same as the peripheral pixels 802. When the filter strength is 1, the modified pixels 812 can result from applying, at 806, the low pass filter (1, 2, 1) to the peripheral pixels. When the filter strength is 2, the low pass filter (5, 6, 5) is applied to the peripheral pixels, at 808, to generate the modified pixels 812. When the filter strength is 3, the process 600 can also apply, at 808, the (5, 6, 5) filter. Alternatively, another, stronger filter can be selected when the filter strength is 3.

In an implementation, a filter can be applied more than once based on the filter strength. For example, and as illustrated in FIG. 8, when the filter strength is equal to 3, the (5, 6, 5) filter is applied twice to obtain the modified pixels 812. That is, the (5, 6, 5) filter is first applied to the peripheral pixels 802, at 808, resulting in intermediate pixels. The (5, 6, 5) is then applied to the intermediate pixels, at 810, to obtain the modified pixels 812.

An example of filtering, also called applying a filter herein, is now provided. At 808, applying, at 808, the low-pass filter with weights (5, 6, 5) to the pixel 714 of FIG. 7 for a filter strength of 2 is performed as follows:

$$\text{modified pixel } 714 = ((5*\text{pixel }724) + (6*\text{pixel }714) + (5*\text{pixel }720))/(5+6+5)$$

Filtering a pixel can use other adjacent pixels such that the pixel to be filtered is centered in the adjacent pixels. That is, for a filter of size n (i.e., an n-tap filter), the process 600 can use (n−1)/2 pixels on each side of the pixel to be predicted. For example, for a 3-tap filter, 1 (i.e., (3−1)/2) pixels can be used on each side of the pixel to be filtered. In the present example, the pixel 714 is centered between the pixel 724 and the pixel 720. When an insufficient number of adjacent pixels is available to filter a pixel, the process 600 can exclude filtering the pixel. For example, while pixel 722 has an above neighboring pixel 736, it does not have a below neighboring pixel. As such, the process 600 can exclude filtering of the pixel 722. In such a case, filtering the pixel 722 is bypassed as described with respect to 804. That is, the process 600 excludes from the filtering (i.e., bypasses) a peripheral pixel of the peripheral pixels when the peripheral pixels are a row above or below (or a column to the left or the right of) the current block and the peripheral pixel does not have at least (n−1)/2 adjacent left peripheral pixels or right peripheral pixels (or adjacent peripheral pixels above or below the peripheral pixel).

In another example, filtering of the pixel 710 can be bypassed. The pixel 710 has a left neighboring pixel 738. However, as the right neighboring pixel 740 is an extended pixel (meaning its value is the same as the pixel 710), the process 600 can bypass filtering of the pixel 710. Alternatively, the process 600 can filter the pixel 710 using the left neighboring pixel 738 and the right neighboring pixel 740 as described previously.

In an example, filtering a corner pixel, such as the corner pixel 716, can be bypassed. Alternatively, the corner pixel can be filtered using adjacent first pixels and adjacent left pixels. For example, the corner pixel 716 can be filtered using pixel 708 (e.g., its adjacent horizontal pixel) and pixel 712 (e.g., its adjacent vertical pixel). Where the first pixels (such as the first pixels 704) form a horizontal row above the current block and the second pixels (such as the second pixels 706) form a vertical column to the left of the current block, the corner pixel 716 can be referred to as the upper-left pixel as mentioned briefly above.

At 606, the process 600 generates a prediction block for the current block using the intra prediction mode and the modified pixels (such as the modified pixels 812 of FIG. 8).

When performed by an encoder, the process 600 can encode, in an encoded bitstream (such as the compressed bitstream 420 of FIG. 4), an indicator (e.g., one or more syntax elements) to apply the filter to the at least some of the pixels peripheral to the current block. The indicator may be encoded into a block, a frame, a slice, and/or a tile header. For example, the indicator may be encoded into the header of the residual block resulting from prediction of the current block. When performed by a decoder, the process 600 can decode from the encoded bitstream (e.g., the compressed bitstream 420 of FIG. 5), the indicator to apply the filter to the at least some of the pixels peripheral to the location of current block. For example, the indicator can identify one or more filters, filter strengths, filter weights, or a combination thereof. The indicator can signal that the decoder is to apply intra-prediction edge filtering. In such cases, the decoder can perform the process 600 to generate a prediction block for decoding the current residual decoded from the encoded bitstream that represents the current block. For example, the indicator can be a tile-level or a block-level parameter indicating to the decoder to modulate the filter strength. The decoder can use the quantization parameter to perform the modulation.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a computer or processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for coding a current block using an intra prediction mode, the intra prediction mode comprising a prediction angle and using pixels peripheral to the current block, the method comprising:
  determining, using the prediction angle, a filter to apply to the pixels peripheral to the current block;
  filtering, using the filter, at least some of the pixels peripheral to the current block resulting in modified pixels; and
  generating a prediction block for the current block using the intra prediction mode and the modified pixels.

2. The method of claim 1, wherein determining the filter is based on an angle delta between the prediction angle and a vertical line parallel to a left edge of the current block.

3. The method of claim 2, wherein determining the filter is further based on a size of the current block.

4. The method of claim 2, wherein determining the filter is further based on a quantization parameter of the current block.

5. The method of claim 2, wherein filtering the at least some of the pixels peripheral to the current block comprises:
  applying the filter more than once based on a strength of the filter.

6. The method of claim 1, wherein the filter is an n-tap filter.

7. The method of claim 6, wherein filtering the at least some of the pixels peripheral to the current block comprises:
  excluding, from the at least some of the pixels peripheral to the current block to be filtered, a peripheral pixel of the peripheral pixels when the peripheral pixels are a row above or below the current block and the peripheral pixel does not have at least (n−1)/2 adjacent left peripheral pixels or right peripheral pixels; and
  excluding, from the at least some of the pixels peripheral to the current block to be filtered, the peripheral pixel when the peripheral pixels are a column to a left or a right of the current block and the peripheral pixel does not have at least (n−1)/2 adjacent peripheral pixels above or below the peripheral pixel.

8. The method of claim 1, further comprising:
  encoding, by an encoder and into an encoded bitstream, an indicator to apply the filter to the at least some of the pixels peripheral to the current block.

9. The method of claim 1, further comprising:
  decoding, by a decoder and from an encoded bitstream, an indicator to apply the filter to the at least some of the pixels peripheral to the current block.

10. An apparatus for encoding or decoding a current block using an intra prediction mode, the intra prediction mode comprising a prediction angle and using pixels peripheral to the current block, the apparatus comprising:
  a memory; and
  a processor configured to execute instructions stored in the memory to:
    determine, using the prediction angle, a filter to apply to the pixels peripheral to the current block;
    filter, using the filter, at least some of the pixels peripheral to the current block resulting in modified pixels; and
    generate a prediction block for the current block using the intra prediction mode and the modified pixels.

11. The apparatus of claim 10, wherein the pixels peripheral to the current block comprise first pixels in a row above the current block and second pixels in a column left of the current block, and wherein the instructions to determine the filter further comprise instructions to:
  determine, using the prediction angle and a vertical line parallel to the column, a first filter for the first pixels and a second filter for the second pixels.

12. The apparatus of claim 11, wherein determining the first filter and the second filter is further based on a size of the current block.

13. The apparatus of claim 11, wherein determining the first filter and the second filter is further based on a quantization parameter of the current block.

14. The apparatus of claim 11, wherein the instructions to determine a filter comprise instructions to determine a filter strength, and the instructions to filter at least some of the pixels peripheral to the current block further comprise instructions to apply the filter one or more times based on the filter strength.

15. The apparatus of claim 10, wherein the filter is an n-tap filter.

16. The apparatus of claim 10, wherein the instructions further include instructions to:
  decode, by a decoder and from an encoded bitstream, an indicator to apply the filter to the pixels peripheral to the current block.

17. An apparatus for encoding or decoding a current block of a current tile using an intra prediction mode, the intra prediction mode comprising a prediction angle and using pixels peripheral to the current block, the apparatus comprising:
  a memory; and
  a processor configured to execute instructions stored in the memory to:
    determine, using a first angle delta between the prediction angle and a vertical line parallel to a column of the current block, a first filter;
    determine, using a second angle delta between the prediction angle and a horizontal line parallel to a row of the current block, a second filter;
    filter, using the first filter, first pixels of the pixels peripheral to the current block that are located in a row adjacent to the current block, resulting in first modified pixels;
    filter, using the second filter, second pixels of the pixels peripheral to the current block that are located in a column adjacent to the current block, resulting in second modified pixels; and
    generate a prediction block for the current block using the intra prediction mode, the first modified pixels, and the second modified pixels.

18. The apparatus of claim 17, wherein the first angle delta is an absolute value of a difference between the prediction angle and 90 degrees, the second angle delta is an absolute value of a difference between the prediction angle and 180 degrees, and the instructions to determine the filter further comprise instructions to:
  on condition that the first angle delta is greater than a threshold, determine a first filter for the first pixels, and otherwise select a bypass filter; and on condition that the second angle delta is greater than the threshold, determine a second filter for the second pixels, and otherwise select the bypass filter.

19. The apparatus of claim 18, wherein the filter is further based on a size of the current block.

20. The apparatus of claim 17, wherein:

when the current block abuts a bottom horizontal edge of the current tile, the second pixels comprise extended vertical pixels, the extended vertical pixels based on a value of at least one pixel of the column that is adjacent to the current block, when the current block abuts a right vertical edge of the current tile, the first pixels comprise extended horizontal pixels, the extended horizontal pixels based on a value of at least one pixel of the row that is adjacent to the current block, and at least one of:

the instructions to filter the first pixels bypass filtering the extended vertical pixels, or the instructions to filter the first pixels bypass filtering the extended horizontal pixels.

\* \* \* \* \*